US012782769B2

(12) United States Patent
Saenger Nayver

(10) Patent No.: US 12,782,769 B2
(45) Date of Patent: Nov. 3, 2026

(54) ELECTRO-OPTIC DEVICE WITH BARRIER PROPERTIES

(71) Applicant: Gentex Corporation, Zeeland, MI (US)

(72) Inventor: Mario F. Saenger Nayver, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 264 days.

(21) Appl. No.: 18/621,865

(22) Filed: Mar. 29, 2024

(65) Prior Publication Data

US 2024/0329455 A1 Oct. 3, 2024

Related U.S. Application Data

(60) Provisional application No. 63/456,141, filed on Mar. 31, 2023.

(51) Int. Cl.

| | |
|---|---|
| ***G02F 1/1335*** | (2006.01) |
| ***G02F 1/1333*** | (2006.01) |
| ***G02F 1/155*** | (2006.01) |
| ***G02F 1/161*** | (2006.01) |

(52) U.S. Cl.

CPC .. *G02F 1/133502* (2013.01); *G02F 1/133302* (2021.01); *G02F 1/155* (2013.01); *G02F 1/161* (2013.01); *G02F 2201/501* (2013.01)

(58) Field of Classification Search

CPC ............................... G02F 1/161; G02F 1/1533

See application file for complete search history.

(56) References Cited

U.S. PATENT DOCUMENTS 5,856,211 A * 1/1999 Tonazzi .................. G02F 1/161 438/69
6,317,248 B1 11/2001 Agrawal et al.
6,407,847 B1 * 6/2002 Poll ......................... G02F 1/153 359/275
6,750,939 B2 * 6/2004 Sojourner ......... G02F 1/133351 349/189
6,795,226 B2 9/2004 Agrawal et al.
(Continued)

FOREIGN PATENT DOCUMENTS

CN 11008676 A 8/2019
CN 114041084 A 2/2022
(Continued)

*Primary Examiner* — Christopher Stanford
(74) *Attorney, Agent, or Firm* — Price Heneveld LLP; Brian James Brewer

(57) ABSTRACT

An electro-optic element includes a first substrate having a first surface and a second surface and defining a first perimeter extending between the first and second surfaces, a second substrate having a third surface and a fourth surface and defining a second perimeter extending between the third and fourth surfaces, and a sealing member adhered between the second and third surfaces and spacing apart the first and second substrates to define a chamber within the first and second substrates and the sealing member. The sealing member has a first exposed surface exterior to the chamber and adjacent the first and second perimeters. The electro-optic element further includes an electro-optic medium disposed within the chamber, and a coating applied over the first exposed surface and at least one of the first and fourth surfaces.

20 Claims, 2 Drawing Sheets

(56) References Cited

U.S. PATENT DOCUMENTS

| | | | | |
|---|---|---|---|---|
| 7,248,392 | B2 | 7/2007 | Rukavina et al. | |
| 8,345,345 | B2 * | 1/2013 | Veenman | G02F 1/157 359/273 |
| 9,766,528 | B2 * | 9/2017 | Kloeppner | G02F 1/1533 |
| 10,795,187 | B2 * | 10/2020 | Cammenga | G02F 1/1339 |
| 10,850,666 | B1 | 12/2020 | Melcher et al. | |
| 11,221,536 | B2 | 1/2022 | Suzuki et al. | |
| 2007/0002422 | A1 | 1/2007 | Dennis | |
| 2017/0028924 | A1 | 2/2017 | Baur et al. | |
| 2017/0130523 | A1 | 5/2017 | Shrivastava et al. | |
| 2018/0196323 | A1 | 7/2018 | Wang et al. | |
| 2019/0025663 | A1 | 1/2019 | Suzuki et al. | |
| 2020/0123844 | A1 | 4/2020 | Neumanl et al. | |
| 2021/0026163 | A1 | 1/2021 | Richlich et al. | |
| 2021/0072609 | A1 | 3/2021 | Saenger Nayver et al. | |
| 2022/0080706 | A1 | 3/2022 | Strong et al. | |

FOREIGN PATENT DOCUMENTS

| | | | | |
|---|---|---|---|---|
| CN | 115421333 | A * | 12/2022 | G02F 1/1339 |
| CN | 114041084 | B | 6/2024 | |
| EP | 3559736 | A1 | 10/2019 | |
| EP | 4004642 | A1 | 6/2022 | |
| EP | 4004642 | A4 | 8/2022 | |
| JP | 2008545166 | A | 12/2008 | |
| JP | 2018018074 | A | 2/2018 | |
| JP | 2020502592 | A | 1/2020 | |
| JP | 6793855 | B2 | 2/2020 | |
| JP | 2021047416 | A | 3/2021 | |
| JP | 2021532408 | A | 11/2021 | |
| JP | 2022541803 | A | 9/2022 | |
| JP | 7345045 | B2 | 9/2023 | |
| KR | 20120007188 | A * | 1/2012 | H01G 9/2077 |
| KR | 20190032432 | A | 3/2019 | |
| TW | 201841036 | A | 11/2018 | |
| TW | 202024762 | A | 7/2020 | |
| WO | 2007005368 | A1 | 1/2007 | |
| WO | 2017168478 | A1 | 10/2017 | |
| WO | 2018118758 | A1 | 6/2018 | |
| WO | 2018119095 | A1 | 6/2018 | |
| WO | 2021016550 | A1 | 1/2021 | |
| WO | 2022048122 | A1 | 3/2022 | |

* cited by examiner

ELECTRO-OPTIC DEVICE WITH BARRIER PROPERTIES

CROSS-REFERENCE TO RELATED APPLICATION

This application claims priority to and the benefit under 35 U.S.C. § 119(e) of U.S. Provisional Application No. 63/456,141, filed on Mar. 31, 2023, entitled "ELECTRO-OPTIC DEVICE WITH BARRIER PROPERTIES," the disclosure of which is hereby incorporated herein by reference in its entirety.

BACKGROUND

The present disclosure relates generally to an electro-optic device and more particularly, relates to an electro-optic device with an anti-reflective conformal coating with chemical barrier properties.

In general, electro-optic elements are generally understood as elements that have an electronically controllable level of light transmittance. When a sufficient potential is applied to the electro-optic element, an embedded electro-optic medium undergoes a change in the level of its light transmission. The change in light transmission may be the result of a color change in the medium such that oxidation and reduction of the anodic and cathodic species therein changes the absorption of the medium, resulting in a reduction in transmission upon application of the potential. Release of the potential may result in maintenance of the reduced transmission state when the anodic and cathodic materials are confined with respect to movement through the chamber, or release of the potential may result in an increase in transmission if the anodic and cathodic materials are allowed to migrate through the chamber or if the reduced cathodic and oxidized anodic are not held separated in the chamber. Electro optic elements can be realized with both a first substrate and a second substrate that define the outer surfaces of the element and generally enclose the electro-optic medium, being of a substantially transparent material, such as various glass compositions, resulting in at least one of the first substrate and the second substrate being generally smooth so as to exhibit light-reflective properties. By nature of such surfaces being on the exterior of the electro-optic element, such light-reflective properties are realized by the electro-optic element, overall.

In some applications of the electro-optic elements, it may be desired to reduce or eliminate such light-reflective properties, such as when used in connection with light filters, eyewear, or the like. Notably, in the listed example applications of the electro-optic elements, it may be further desired to reduce the light-reflective properties of the electro-optic element without making the outer surfaces appear matte or frosted, as in many applications significant optical clarity may be desired.

SUMMARY

According to one aspect of the present disclosure, an electro-optic element includes a first substrate having a first surface and a second surface and defining a first perimeter extending between the first and second surfaces, a second substrate having a third surface and a fourth surface and defining a second perimeter extending between the third and fourth surfaces, and a sealing member adhered between the second and third surfaces and spacing apart the first and second substrates to define a chamber within the first and second substrates and the sealing member. The sealing member has a first exposed surface exterior to the chamber and adjacent the first and second perimeters. The electro-optic element further includes an electro-optic medium disposed within the chamber, an opening defined by and extending through one of the first and second substrates and extending therethrough, a plug disposed within the opening, the plug defining a second exposed surface, and a coating applied over the first and second exposed surfaces and at least one of the first and fourth surfaces.

According to another aspect of the present disclosure, a method for manufacturing an electro-optic element includes exposing an in-process unit to an atomic layer deposition process. The in-process unit includes a first substrate having a first surface and a second surface and defining a first perimeter extending between the first and second surfaces, a second substrate having a third surface and a fourth surface and defining a second perimeter extending between the third and fourth surfaces, wherein an opening is defined by and extends through one of the first and second substrates. A sealing member is adhered between the second and third surfaces and spaces apart the first and second substrates to define a chamber within the first and second substrates and the sealing member. The sealing member has a first exposed surface exterior to the chamber and adjacent the first and second perimeter. An electro-optic medium is disposed within the chamber, and a plug is disposed within the opening, the plug defining a second exposed surface. The atomic layer deposition process forms an anti-reflective coating over the first and second exposed surfaces and at least one of the first and fourth surfaces. The anti-reflective coating is, further, a conformal coating that defines a chemical barrier over at least portions of the in-process unit.

According to another aspect of the present disclosure, an electro-optic element includes a first substrate having a first surface and a second surface and defining a first perimeter extending between the first and second surfaces and a second substrate having a third surface and a fourth surface and defining a second perimeter extending between the third and fourth surfaces, wherein at least one of the first surface and the fourth surface has reflective properties. A sealing member is adhered between the second and third surfaces and spaces apart the first and second substrates to define a chamber within the first and second substrates and the sealing member. The sealing member has a first exposed surface exterior to the chamber and adjacent the first and second perimeters. The electro-optic element further includes an electro-optic medium disposed within the chamber and a conformal coating having anti-reflective properties applied over the first exposed surface and at least one of the first and fourth surfaces.

These and other features, advantages, and objects of the present device will be further understood and appreciated by those skilled in the art upon studying the following specification, claims, and appended drawings.

BRIEF DESCRIPTION OF THE DRAWINGS

The present disclosure will become more fully understood from the detailed description and the accompanying drawings, wherein.

DETAILED DESCRIPTION OF EMBODIMENTS

Figure 1:
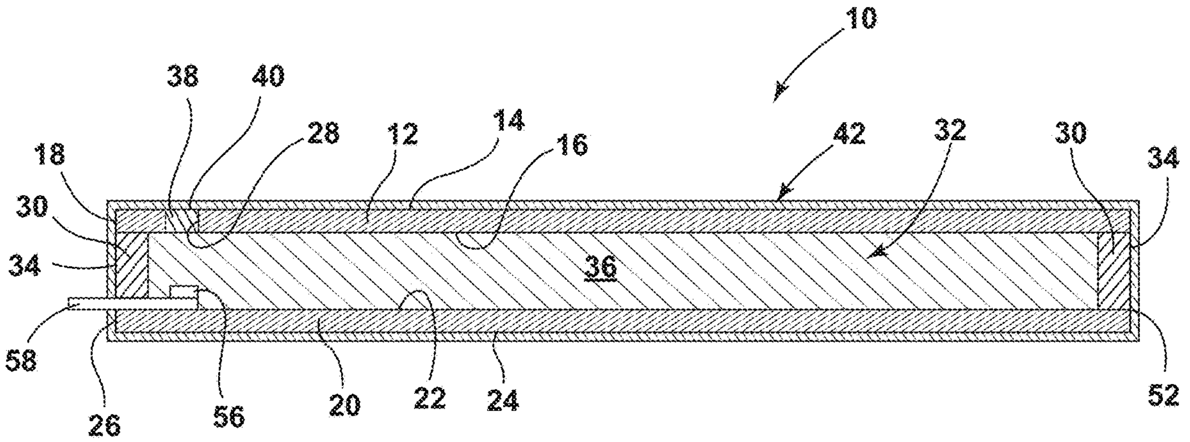
FIG. 1 is a schematic view of an electro-optic element according to an aspect of the disclosure.

The present illustrated embodiments reside primarily in combinations of method steps and apparatus components related to an imaging and display system. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Ordinal modifiers (i.e., "first", "second", etc.) may be used to distinguish between various structures of a disclosed device in various contexts, but that such ordinals are not necessarily intended to apply to such elements outside of the particular context in which they are used and that, in various aspects different ones of the same class of elements may be identified with the same, context-specific ordinal. In such instances, other particular designations of the elements are used to clarify the overall relationship between such elements. Ordinals are not used to designate a position of the elements, nor do they exclude additional, or intervening, non-ordered elements or signify an importance or rank of the elements within a particular class.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the terms "about", "approximately", or "substantially" are intended to mean that a value of a parameter is close to a stated value or position. However, minor differences may prevent the values or positions from being exactly as stated. Thus, unless otherwise noted, differences of up to ten percent (10%) for a given value are reasonable differences from the ideal goal of exactly as described. In many instances, a significant difference can be when the difference is greater than ten percent (10%), except as where would be generally understood otherwise by a person of ordinary skill in the art based on the context in which such term is used.

Figure 2:
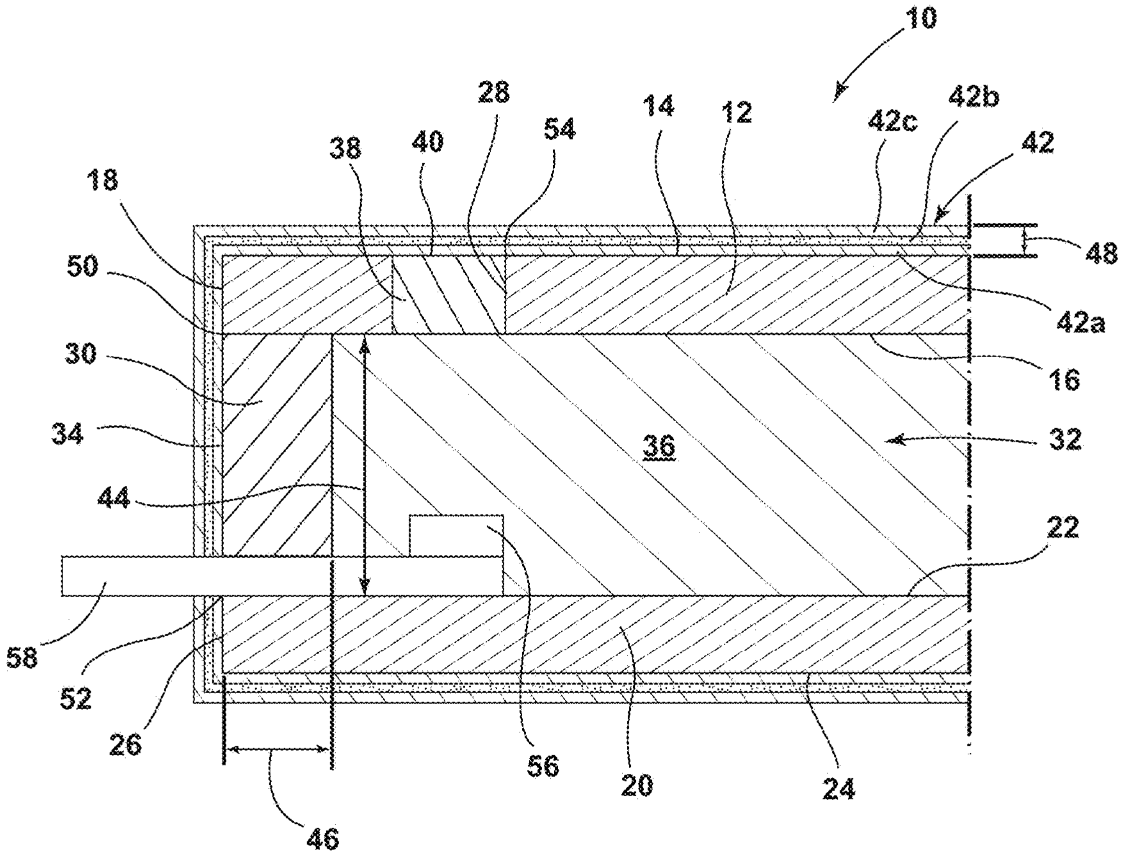
FIG. 2 is a detail view of the electro-optic element of FIG. 1.

Referring to FIGS. 1 and 2, reference numeral 10 generally designates an electro-optic element 10 that includes a first substrate 12 having a first surface 14 and a second surface 16 and defining a first perimeter 18 extending between the first and second surfaces 14 and 16 and a second substrate 20 having a third surface 22 and a fourth surface 24 and defining a second perimeter 26 extending between the third and fourth surfaces 22 and 24. An opening 28 is defined by and extends through one of the first and second substrates 12 or 20. A sealing member 30 is adhered between the second and third surfaces 16 and 22 and spaces apart the first and second substrates 12 and 20 to define a chamber 32 within the first and second substrates 12 and 20 and the sealing member 30. The sealing member 30 has a first exposed surface 34 external to the chamber 32 and adjacent the first and second perimeters 18 and 26. The electro-optic element 10 further includes an electro-optic medium 36 disposed within the chamber 32, a plug 38 disposed within the opening 28 and defining a second exposed surface 40, and a coating 42 applied over the first and second exposed surfaces 34 and 40 and at least one of the first and fourth surfaces 14 and 24.

The electro-optic medium 36 can be of various compositions generally known in the art that vary in transparency from mostly transparent to mostly opaque with the application of an electrical potential thereto. In this manner, it is understood that when a sufficient potential is applied to the electro-optic element 10, the electro-optic medium 36 undergoes a change in the level of light transmission therethrough. The change in light transmission may be the result of a color change in the medium 36 such that oxidation and reduction of the anodic and cathodic species therein changes the absorption of the medium 36, resulting in a reduction in transmission upon application of the potential. Release of the potential may result in maintenance of the reduced transmission state when the anodic and cathodic materials are confined with respect to movement through the chamber 32, or release of the potential may result in an increase in transmission if the anodic and cathodic materials are allowed to migrate through the chamber 32 or if the reduced cathodic and oxidized anodic are not held separated in the chamber 32. Shorting of the electro-optic element 10 after application of a potential may speed up the time necessary for the transmission state to return to the original, pre-potential light transmission. Momentarily reversing the applied potential may also speed the change in transmission from low light transmission to high light transmission. In various implementations, the electro-optic element 10 may be a window or a part thereof, such as an architectural window, car window, or aircraft window, where both substrates are substantially transparent. The device may also be a light filter. In another, specific embodiment, the electro-optic element 10 may be a lens in a pair of glasses that may include the necessary circuitry to realize the above applications of potential to the one or more lenses therein.

As can be appreciated, the electro-optic medium 36 can take a number of different forms such as thermoplastic polymeric films, solution phase, or gelled phase. Illustrative electro-optic media are those as described in U.S. Pat. Nos. 4,902,108; 5,888,431; 5,940,201; 6,057,956; 6,268,950, 6,635,194, and 8,928,966, 10,539,853, and U.S. Patent Application Publication No. 2002/0015214, the entire contents of which are hereby incorporated by reference herein. The anodic and cathodic electro-optic materials within the electro-optic medium 36 can also include coupled materials as described in U.S. Pat. No. 6,249,369. The concentration of the electro-optic materials can be selected as taught in U.S. Pat. No. 6,137,620. Additionally, a single-layer, single-phase medium may include a medium where the anodic and cathodic materials are incorporated into a polymer matrix as is described in International Patent Application Serial Nos. PCT/EP98/03862 and PCT/US98/05570.

The electro-optic medium may be multilayer or multiphase. In multilayered, the medium may be made up in layers and includes an electroactive material attached directly to an electrically conducting electrode or confined in close proximity thereto which remains attached or confined when electrochemically oxidized or reduced. In multiphase, one or more materials in the medium undergoes a change in phase during the operation of the device, for example a material contained in solution in the ionically conducting electrolyte forms a separate layer on the electrically conducting electrode when electrochemically oxidized or reduced.

The electro-optic medium 36 may include materials such as, but not limited to, anodics, cathodics, light absorbers, light stabilizers, thermal stabilizers, antioxidants, thickeners, viscosity modifiers, tint providing agents, redox buffers, and mixtures thereof. According to some embodiments, the anodic materials may include, but are not limited to, ferrocenes, ferrocenyl salts, phenazines, phenothiazines, and thianthrenes. The anodic materials may also include those incorporated into a polymer film such as polyaniline, polythiophenes, polymeric metallocenes, or a solid transition metal oxide, including, but not limited to, oxides of vanadium, nickel, iridium, as well as numerous heterocyclic compounds. Other anodic materials may include those as described in in U.S. Pat. Nos. 4,902,108; 6,188,505; and 6,710,906. In any of the above aspects, the anodic material may be a phenazine, a phenothiazine, a triphenodithiazine, a carbazole, an indolocarbazole, a biscarbazole, or a ferrocene confined within the second polymer matrix, the second polymer matrix configured to prevent or minimize substantial diffusion of the anodic material in the activated state.

Cathodic materials may include, for example, viologens, such as methyl viologen, octyl viologen, or benzyl viologen; ferrocinium salts, such as (6-(tri-tert butylferrocenium) hexyl) triethylammonium. While specific cathodic materials have been provided for illustrative purposes only, numerous other conventional cathodic materials are likewise contemplated for use including, but by no means limited to, those disclosed in previously referenced and incorporated U.S. Pat. Nos. 4,902,108, 6,188,505, and 6,710,906. Moreover, it is contemplated that the cathodic material may include a polymer film, such as various polythiophenes, polymeric viologens, an inorganic film, or a solid transition metal oxide, including, but not limited to, tungsten oxide. The cathodic material may be a protic soluble electro-optic material (e.g., soluble in a protic solvent such as an alcohol and/or water), or a single component electro-optic material (i.e., the electro-optic material includes a compound that includes both cathodic and anodic moieties in the same molecule or cation/anion combination), such as described in U.S. Provisional Appl. No. 62/257,950, filed on Nov. 20, 2015, and 62/258,051, filed on Nov. 20, 2015. Further examples of anodic and cathodic materials may be found in U.S. Pat. Nos. 4,902,108; 5,294,376; 5,998,617; 6,193,912; and 8,228,590.

For illustrative purposes only, the concentration of the anodic and/or cathodic materials in the electro-optic medium can range from approximately 1 millimolar (mM) to approximately 500 mM and more preferably from approximately 2 mM to approximately 100 mM. While particular concentrations of the anodic as well as cathodic materials have been provided, it will be understood that the desired concentration may vary greatly depending upon the geometric configuration of the chamber containing the electro-optic medium.

For purposes of the present disclosure, a solvent of electro-optic medium may comprise any of a number of common, commercially available solvents including 3-methylsulfolane, dimethyl sulfoxide, dimethyl formamide, tetraglyme and other polyethers; alcohols such as ethoxyethanol; nitriles, such as acetonitrile, glutaronitrile, 3-hydroxypropionitrile, and 2-methylglutaronitrile; ketones including 2-acetylbutyrolactone, and cyclopentanone; cyclic esters including beta-propiolactone, gamma-butyrolactone, and gamma-valerolactone; organic carbonates including propylene carbonate (PC), ethylene carbonate and methyl ethyl carbonate; and mixtures of any two or more thereof.

The electro-optic medium may include a thermoplastic polymer in which the electro-optic materials are confined (an "electro-optic thermoplastic"). Such media are described in U.S. Provisional Application No. 62/184,704, filed on May 25, 2015.

The above-described sealing member 30 surrounds and helps to retain the electro-optic medium 36 between the substrates 12 and 20. Non-limiting examples of suitable materials for the sealing member include silicones, epoxies, acrylics, hot melts, and polyurethanes. As can be appreciated, the height 44 of the sealing member 30 may vary depending on multiple factors, including but not limited to, the composition of the electro-optic medium 36, the overall size of the electro-optic element 10, the desired chroma and dynamic range of the electro-optic element 10, and the like. In a similar manner, the thickness 46 of the sealing member 30 can vary based on the height 44 thereof, with a taller electro-optic element 10 generally corresponding with a thicker sealing member 30 to deliver the desired level of support between the first substrate 12 and the second substrate 20. Additionally, the thickness 46 of the sealing member can vary with the sealing requirements of the electro-optic element 10 with respect to the chamber 32 and the electro-optic medium 36 contained therein. In various respects, the particular composition of the sealing member 30 can influence its supportive and sealing properties, as well as its adhesion to the first substrate 12 and the second substrate 20, with respect to both the strength and longevity of such adhesion.

In general, an electro-optic element 10 according to the present disclosure will be configured with the sealing member 30 positioned such that the first exposed surface 34 thereon is adjacent to the perimeter 18 of the first substrate 12 and the perimeter 26 of the second substrate 20. In some implementations, the first exposed surface 34 can be generally flush with the perimeter 18 of the first substrate 12 and the perimeter 26 of the second substrate 20, with some concavity of the first exposed surface 34 arising from shrinking of the sealing member during curing or due to surface tension realized with respect to the second surface 16 and the third surface 22. In other implementations, the first exposed surface 34 can be inset somewhat with respect to the perimeters 18 and 26, while still being considered adjacent thereto. By way of example, the first exposed surface 34 can be inset with respect to the perimeters 18 and 26 by between 1 mm and 2 mm, and in some implementations up to about 5 mm, although further variations are possible.

In various aspects of the electro-optic element 10 disclosed herein, at least one of the first substrate 12 and the second substrate 20 can be substantially transparent. The term "substantially transparent" as used herein will be understood by persons of ordinary skill in the art and will vary to some extent depending upon the context in which it is used. If there are uses of the term which are not clear to persons of ordinary skill in the art, given the context in which it is used, the term means that the material allows a light transmission of about 75% or more of a beam of light having a wavelength of 400 nm directed to the material at a specular angle of 10° through a thickness of 2 mm of the material. In various applications, one or both of the first substrate 12 and the second substrate 20 can include respective conductive material coatings on the second surface 16 and the third surface 22 to facilitate application of the above-described electric potential to the electro-optic medium 36. In connection with the substantially transparent configurations of the first and second substrates 12 and 20 described herein, the conductive coatings can include transparent conductive oxide (TCO) coatings. For example, the conductive material may be a TCO such as indium tin oxide (ITO), indium zinc oxide (IZO), zinc oxide, and tin oxide.

In general, many applications of the disclosed electro-optic element 10 will be realized with both the first substrate 12 and the second substrate 20 being of a substantially transparent material, such as various glass compositions known in the art, as well as various plastics, composites, or the like. In this respect, it can be appreciated that the use of glass or transparent plastic for the first substrate 12 and/or the second substrate 20, in many applications, will result in at least a respective one of the first surface 14 and the fourth surface 24 being generally smooth so as to exhibit light-reflective properties. By nature of such surfaces 14 and 24 being on the exterior of the electro-optic element 10, such light-reflective properties are realized by the electro-optic element 10, overall. In one aspect, the material may be selected such that at least one of the first substrate 12 and the second substrate 20 are rigid.

In some applications of the electro-optic element 10, it may be desired to reduce or eliminate such light-reflective properties, such as when used in connection with light filters, eyewear, or the like. Notably, in the listed example applications of the electro-optic element 10, it may be further desired to reduce the light-reflective properties of the electro-optic element 10 without making the first and fourth surfaces 14 and 24 appear matte or frosted, as in many applications significant optical clarity may be desired. In this respect, the coating 42 can be realized as one of various conformal coatings having anti-reflective properties. More specifically, the coating 42 can be applied by an atomic layer deposition ("ALD") process, which is noted for evenly coating objects with very low variation in coating thickness 48, composition, and surface quality. Notably, such coatings are considered conformal in their even coating of entire exposed portions of objects at a consistent thickness that is "self-limiting" by way of the application process and achieves such consistent coating over a wide array of object surface variations, including interior and exterior corners, grooves, projections and indentations, and other surface imperfections. ALD is a vapor deposition process that creates a thin, even material layer that coats the entire outer exposed surface of the article exposed to the vapor. This occurs independent of the shape, such that seams and imperfections are coated at a predictable thickness.

By way of example, a conformal coating 42 can be applied in multiple layers 42*a*, 42*b*, 42*c*, as shown in FIG. 2 to achieve an overall thickness 48 of at least about 100 nm and, in some examples, at least about 150 nm. In this respect, it is noted that while three layers 42*a*, 42*b*, 42*c* are shown, the depicted layers are merely illustrative and electro-optic elements 10 according to the disclosure may include more or fewer layers than what is illustrated. At the noted thickness 48, the coating 42 can achieve the desired properties using various metal oxides, such as Aluminum oxide ($Al_2O_3$), Silicon dioxide $Si0_2$, Tantalum oxide (also referred to as Tantalum pentoxide; Ta2O5) Titanium oxide (which may encompass various compounds including Titanium dioxide (titanium(IV) oxide), $TiO_2$; Titanium(II) oxide (titanium monoxide); TiO, a non-stoichiometric oxide; Titanium(III) oxide (dititanium trioxide), $Ti_2O_3$; $Ti_3O$; $Ti_2O$; δ-$TiO_x$ (x=0.68-0.75); $Ti_nO_{2n-1}$, where n ranges from 3-9, inclusive). In further aspects, the various layers 42*a*, 42*b*, 42*c* can have different compositions to achieve and/or tune the properties of the coating 42 noted herein according to specific applications. In various implementations, the coating 42 described herein can exhibit low reflectance of, for example, approximately 0.05% at around 410 nm and 550 nm with about 0.07% average reflectance between 380-620 nm.

In addition to the noted anti-reflective properties, the conformal coating 42 according to the various implementations described herein can define a chemical barrier over the portions of the electro-optic element 10 to which it is applied. In this respect, the coating 42 described herein can improve durability and/or longevity of the electro-optic element 10. More particularly, the various conformal coatings 42, applied using the ALD processes discussed herein, have been demonstrated to have useful solvent and oxygen barrier properties when used as a chemical barrier for solvent-based electro-optic devices. In this respect, the coating 42 can prevent the incursion of oxygen into the chamber 32 as well as the escape of any solvents within the electro-optic medium 36 from chamber 32. Accordingly, the coating 42 discussed herein, according to the various disclosed implementations relating to the ALD coating process, can be used to realize an electro-optic element 10 with low-reflectance and beneficial barrier properties. The result is the disclosed electro-optic element 10 with low reflectance on the outward-facing surfaces (first surface 14 and fourth surface 24) and a conformal chemical barrier that further encloses the exposed surfaces 34 and 40, as well as the interfaces of the sealing member 30 and the plug 38 with the relevant ones of the first substrate 12 and the second substrate 20. This barrier can increase the durability and/or longevity of the electro-optic element 10 by covering imperfections and improving the general performance of the in sealing member 30 and plug 38, including at interfaces with the first and second substrates 12 and 20. In certain aspects, the improved barrier performance achieved by coating 42 can be used to enable the reduction in the thickness 46 of the sealing member 30, as well as of the plug 38, while maintaining or even improving general performance and longevity.

In more specific aspects, the coating 42 acts as a gas diffusion barrier is a barrier to incursion of gas, such as oxygen or water vapor, into the electro-optic element 10. Thus, the gas diffusion barrier may minimize or prevent the incursion of the gas into the electro-optic element 10. For example, where the gas to be excluded by the diffusion barrier is oxygen, the gas diffusion barrier prevents, or at least minimizes, the incursion of oxygen into the electro-optic element 10. Where the gas to be excluded is water vapor, the gas diffusion barrier prevents, or at least minimizes, the incursion of water into the electro-optic element 10. In some embodiments, the gas diffusion barrier is a barrier to a single gas, while in other embodiments, the gas diffusion barrier is a barrier to multiple gases. This may be provided by a single layer gas diffusion barrier or multiple layer gas diffusion barriers (i.e., by way of the multiple layers 42*a*, 42*b*, 42*c* discussed above). For electro-optic device 10, the resulting sealing member 30 or plug 38 coated with the gas barrier may have an oxygen transmission rate that is less than $10^{-2}$ $cm^3/m^2$/day atm. This may include less than $10^{-3}$ $cm^3/m^2$/day atm and less than $10^{-4}$ $cm^3/m^2$/day atm. As discussed above, coatings 42 and/or coating layers 42*a*, 42*b*, 42*c* . . . 42*n* useable to achieve such performance may include, but are not limited to, those of $Al_2O_3$, $Si_3N_4$, SN, TiN, $SiO_xN_y$, indium tin oxide (ITO), $SiO_2$, $ZnO_2$, or $TiO_2$, where x and y are from greater than 0 to 4.

As shown in the Figures, the coating 42 and corresponding chemical barrier can extend at least over the first and second exposed surfaces 34 and 40 and over a first interface 50 between the first perimeter 18 and the first exposed surface 34 (and generally extending between the second surface 16 and the portion of the sealing member 30 in contact therewith), a second interface 52 between the second perimeter 26 and the first exposed surface 34 (and generally extending between the third surface 22 and the portion of the sealing member 30 in contact therewith), and a third interface between the one of the first and second substrates 12 and 20 through which the opening 28 extends and the second exposed surface 40. Notably, as shown in FIGS. 1 and 2, the opening 28 is shown as extending through the first substrate 12, but in alternative arrangements, the opening 28 can extend through the second substrate 20. In a still further alternative arrangement, shown in FIG. 3, the opening 28 can extend through the sealing member 30 such that the plug 38 is disposed within and interfaces to the sealing member 30.

As further shown in FIGS. 1 and 2, the electro-optic element 10 can further include a first conductive bus 56 disposed on one of the second or third surfaces 16 or 22 and in electrical communication with the electro-optic medium 36, including by being in contact with the above-described transparent conductive coating applied to the respective surface. In this manner, the conductive bus 56 is configured for use in the application of potential to the electro-optic medium 36, as discussed above. The conductive bus 56 can receive the current used in the application of potential by way of a first terminal 58 electrically connected with the first conductive bus 56 and exposed on the exterior of the electro-optic element 10. To maintain the ability of the terminal 58 to conduct a current to the bus 56, the terminal 58, as shown in FIGS. 1 and 2, is uncovered by the coating 42. As discussed further below, this can be achieved by masking all or an operative portion of the terminal 58 during the ALD process. In various implementations, the electro-optic element 10 can include two such terminals 58 connected with the same bus 56 or an additional bus that can be coupled with the other of the two inner surfaces 16 and 22, depending on the particular structure of the electro-optic element 10 and the composition of the electro-optic medium 36. In these variations, both such terminals 58 (or more, where applicable) are uncovered, in whole or part, by the coating 42. More particularly, the bus(es) 56 can be connected with a power source by a controller to provide variations in the darkening effect realized in the electro-optic medium 36 across the span of the electro-optic element 10. In particular, the controller can be configured to vary the configuration of the electrical connection with the bus(es) 56 to selectively cause the electro-optic medium 36 to change between respective darkened and transparent states (including within various transition states therebetween in certain configurations).

Figure 3:
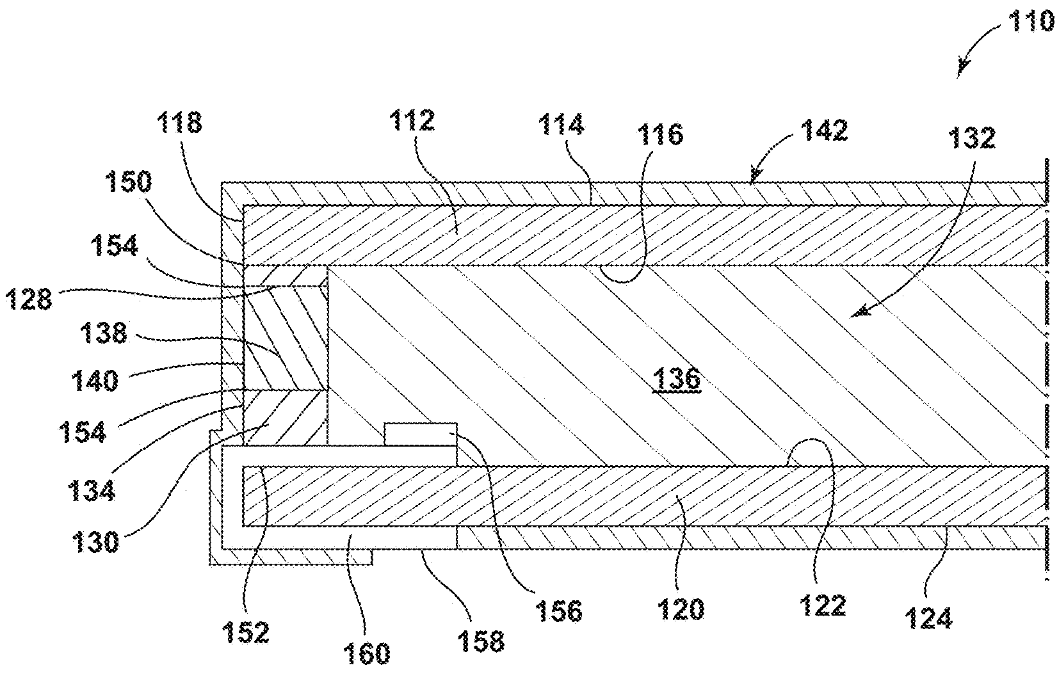
FIG. 3 is a schematic view of a variation of the electro-optic element.

In a variation shown in FIG. 3 (in which similar features are indicated by similar reference numbers increased by 100), the terminals 158 are positioned along the fourth surface 24 of second substrate 20 and are connected with the bus 156 by respective leads 160. In a similar manner to that which is discussed above, the coating 142 is not present over at least portions of the terminals 158 such that an electrical connection can be made therewith. The example of electro-optic element 110 shown in FIG. 3 is also configured with the opening 128 to the chamber 132 formed in the sealing member 130. In connection with the positioning of opening 128, the plug 138 is positioned within the sealing member 130 such that the interface 152 around the plug 138 is between the plug 138 and the sealing member 130. Accordingly, the coating 142 extends over the interface 152 and adjacent portions of the second exposed surface 140, which is within the first exposed surface 134.

Figure 4A:
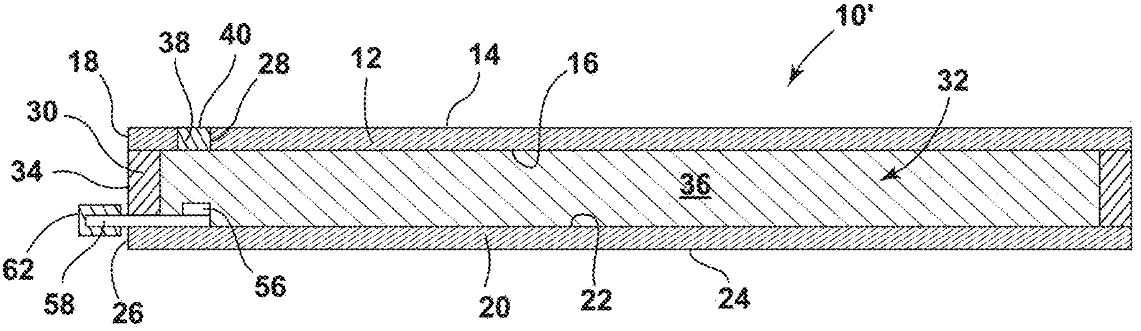
FIGS. 4A and 4B are schematic views of an in-process unit during successive steps in a process for making the electro-optic element of FIG. 1.

In another aspect of the disclosure, a method for manufacturing an electro-optic element 10 or 110, as disclosed herein and shown in FIGS. 1-3, includes exposing an in-process unit 10', as shown in FIG. 4, to an atomic layer deposition ("ALD") process. In general, the in-process unit 10' can comprise a typical electro-optic element 10 according to the variations discussed herein in a pre-coating stage. In this manner, it is noted that the ALD process according to the disclosure can be applied over a "laid up" or otherwise complete electro-optic element 10 according to various known structures. In the present example, the in-process unit 10' can include first substrate 12 having first surface 14 and second surface 16 and defining first perimeter 18 extending between the first and second surfaces 14 and 16, second substrate 20 having third surface 22 and a fourth surface 24 defining a second perimeter 26 extending between the third and fourth surfaces 22 and 24. The opening 28 is defined by and extends through one of the first and second substrates 12 or 20. Sealing member 30 is adhered between the second and third surfaces 16 and 22 and spaces apart the first and second substrates 12 and 20 to define chamber 32 within the first and second substrates 12 and 20 and the sealing member 30. The sealing member 30 has a first exposed surface 34 exterior to the chamber 32 and adjacent the first and second perimeters 18 and 26. In one aspect, the in-process unit 10' can be assembled as such by adhering or otherwise forming the sealing member 30 between the first and second substrates 12 and 20, as further described above with reference to FIGS. 1 and 2, to define the chamber 32 therein.

In some aspects, the sealing member 30 may be applied as a liquid layer around the perimeter 18 or 26 of one of the substrates 12 or 20, and heat, ultraviolet light, or a combination thereof can be applied to cure the liquid layer and form the sealing member 30. Non-limiting examples of suitable liquid layer materials include silicones, epoxies, acrylics, hot melts, and polyurethanes. In another aspect, a pre-formed layer, such as a pressure-sensitive adhesive layer (e.g., an acrylic) can be used to form the sealing member 30. In these examples, the sealing member 30 may optionally extend between the first and second electrically conductive layers applied over the second and third surfaces 16 and 22 or can have a generally C-shaped cross-sectional profile (for examples where the opening 128 is defined within the sealing member 130).

Figure 4B:
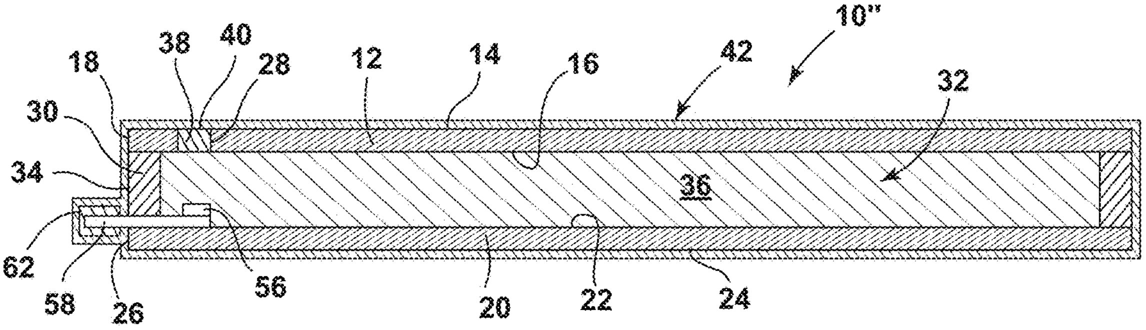

The depicted in-process unit 10' can be completed, in one example by depositing electro-optic medium 36 in the chamber 32 through opening 28, although other processes are possible in light of the further discussion above. Plug 38 is disposed within the opening 28 and defines second exposed surface 40, resulting in the in-process unit 10' shown in FIG. 4A. The in-process unit 10' is then subjected to an ALD process to form the anti-reflective coating 42, described further above, over the first and second exposed surfaces 34 and 40 and at least one of the first and fourth surfaces 14 and 24. As discussed above, the anti-reflective coating 42 is, further, a conformal coating that defines a chemical barrier over at least portions of the in-process unit 10', as shown in FIG. 4B. In one example, the ALD process can be carried out by placing the in-process unit 10' of FIG. 4A into a vaporization chamber, where a reactive chemical, precursor, and reactor are introduced to the chamber so as to be exposed to the in-process unit 10'. After a predetermined time, interval, the excess vapor is evacuated from the chamber such that a single monolayer (e.g., 42*a* in FIG. 2) is deposited over all exposed areas of the in-process unit 10'. Successive steps of such exposure and evacuation can be used to deposit additional layers (e.g., 42*b*, 42*c* . . . 42*n*) of the same of different metal oxide to achieve the desired composition and thickness 48 of the coating 42, as shown in FIG. 4B. In some aspects, additional etching processes can be applied to the exterior of the coating 42 to enhance or add optical properties.

As discussed above, the in-process unit 10' may include at least one terminal 58 (or 158) on an exterior of the in-process unit 10' that is used to create an electrical potential within the electro-optic medium 36, requiring that the conductivity of the terminal 58 be maintained. In this manner, a mask 62 can be applied over the terminal 58 during fabrication of the in-process unit 10' prior to the ALD process. In this manner, the ALD process depositing coating 42 over the mask 62 such that removal of the mask 62 results in the structure shown in FIG. 1, for example, in which the terminal 58, or a portion thereof, is uncoated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

The above description is considered that of the preferred embodiments only. Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the claims as interpreted according to the principles of patent law, including the doctrine of equivalents.

What is claimed is:

1. An electro-optic element comprising:

a first substrate having a first surface and a second surface and defining a first perimeter extending between the first and second surfaces;

a second substrate having a third surface and a fourth surface and defining a second perimeter extending between the third and fourth surfaces, wherein an opening is defined by and extending through one of the first and second substrates;

a sealing member adhered between the second and third surfaces and spacing apart the first and second substrates to define a chamber within the first and second substrates and the sealing member, the sealing member having a first exposed surface exterior to the chamber and adjacent the first and second perimeters;

an electro-optic medium disposed within the chamber;

a plug disposed within the opening, the plug defining a second exposed surface; and a transparent, anti-reflective conformal coating applied over the first and second exposed surfaces and at least one of the first and fourth surfaces.

2. The electro-optic element of claim 1, wherein at least one of the first substrate and the second substrate is transparent.

3. The electro-optic element of claim 1, wherein at least one of the first surface and the fourth surface is generally smooth so as to exhibit light-reflective properties.

4. The electro-optic element of claim 1, wherein at least one of the first substrate and the second substrate is rigid.

5. The electro-optic element of claim 4, wherein at least one of the first substrate and the second substrate is glass.

6. The electro-optic element of claim 1, wherein the conformal coating defines a chemical barrier over at least portions of the electro-optic element.

7. The electro-optic element of claim 6, wherein the chemical barrier extends at least over the first and second exposed surfaces and over a first interface between the first perimeter and the first exposed surface, a second interface between the second perimeter and the first exposed surface, and a third interface between the one of the first and second substrates through which the opening extends and the second exposed surface.

8. The electro-optic element of claim 6, wherein the chemical barrier has an oxygen transmission rate that is less than $10^{-2}$ $cm^3/m^2$/day/atm.

9. The electro-optic element of claim 1, wherein the coating is applied by an atomic layer deposition process and has a thickness of at least about 100 nm.

10. The electro-optic element of claim 1, further including:

a first conductive bus disposed on one of the second or third surfaces in contact with the electro-optic medium; and a first terminal electrically connected with the first conductive bus and exposed on an exterior of the electro-optic element and uncovered by the coating.

11. A method for manufacturing an electro-optic element, comprising:

exposing an in-process unit to an atomic layer deposition process, the in-process unit including:

a first substrate having a first surface and a second surface and defining a first perimeter extending between the first and second surfaces;

a second substrate having a third surface and a fourth surface and defining a second perimeter extending between the third and fourth surfaces, wherein an opening is defined by and extends through one of the first and second substrates;

a sealing member adhered between the second and third surfaces and spacing apart the first and second substrates to define a chamber within the first and second substrates and the sealing member, the sealing member having a first exposed surface exterior to the chamber and adjacent the first and second perimeters;

an electro-optic medium disposed within the chamber; and a plug disposed within the opening, the plug defining a second exposed surface; wherein the atomic layer deposition process forms a transparent, anti-reflective coating over the first and second exposed surfaces and at least one of the first and fourth surfaces, the coating being a conformal coating that defines a chemical barrier over at least portions of the electro-optic element.

12. The method of claim 11, wherein prior to exposing the in-process unit to the atomic layer deposition process, at least one of the first substrate and the second substrate is transparent and at least one of the first surface and the fourth surface is generally smooth so as to exhibit light-reflective properties.

13. The method of claim 12, wherein after exposing the in-process unit to the atomic layer deposition process, the at least one of the first substrate and the second substrate retains a transparent appearance, and the at least one of the first surface and the fourth surface exhibits non-reflective properties.

14. The method of claim 11, wherein the conformal coating defines a chemical barrier that extends at least over the first and second exposed surfaces and over a first interface between the first perimeter and the first exposed surface, a second interface between the second perimeter and the first exposed surface, and a third interface between the one of the first and second substrates through which the opening extends and the second exposed surface.

15. The method of claim 11, wherein:

the in-process unit further includes:

a first conductive bus disposed on one of the second or third surfaces in contact with the electro-optic medium;

a first terminal electrically connected with the first conductive bus and exposed on an exterior of the electro-optic element; and a mask applied over a portion of the first terminal; and the method further includes removing the mask after exposing the in-process unit to the atomic layer deposition process such that at least a portion of the first terminal is uncovered by the coating.

16. The method of claim 11, wherein the atomic layer deposition process, such that the coating has a thickness of at least about 100 nm.

17. An electro-optic element comprising:

a first substrate having a first surface and a second surface and defining a first perimeter extending between the first and second surfaces;

a second substrate having a third surface and a fourth surface and defining a second perimeter extending between the third and fourth surfaces, wherein at least one of the first surface and the fourth surface has reflective properties;

a sealing member adhered between the second and third surfaces and spacing apart the first and second substrates to define a chamber within the first and second substrates and the sealing member, the sealing member having a first exposed surface exterior to the chamber and adjacent the first and second perimeters;

an electro-optic medium disposed within the chamber; and a transparent conformal coating having anti-reflective properties applied over the first exposed surface and at least one of the first and fourth surfaces.

18. The electro-optic element of claim 17, wherein the conformal coating defines a chemical barrier having an oxygen transmission rate that is less than $10^{-2}$ $cm^3/m^2$/day/atm.

19. The electro-optic element of claim 17, wherein the conformal coating is applied by an atomic layer deposition process and has a thickness of at least about 100 nm.

20. The electro-optic element of claim 17, further including:

a first conductive bus disposed on one of the second or third surfaces in contact with the electro-optic medium; and a first terminal electrically connected with the first conductive bus and exposed on an exterior of the electro-optic element and uncovered by the conformal coating.

* * * * *